June 30, 1931.  W. D. SCHAEFER  1,812,833
GAS ENGINE
Filed July 25, 1929
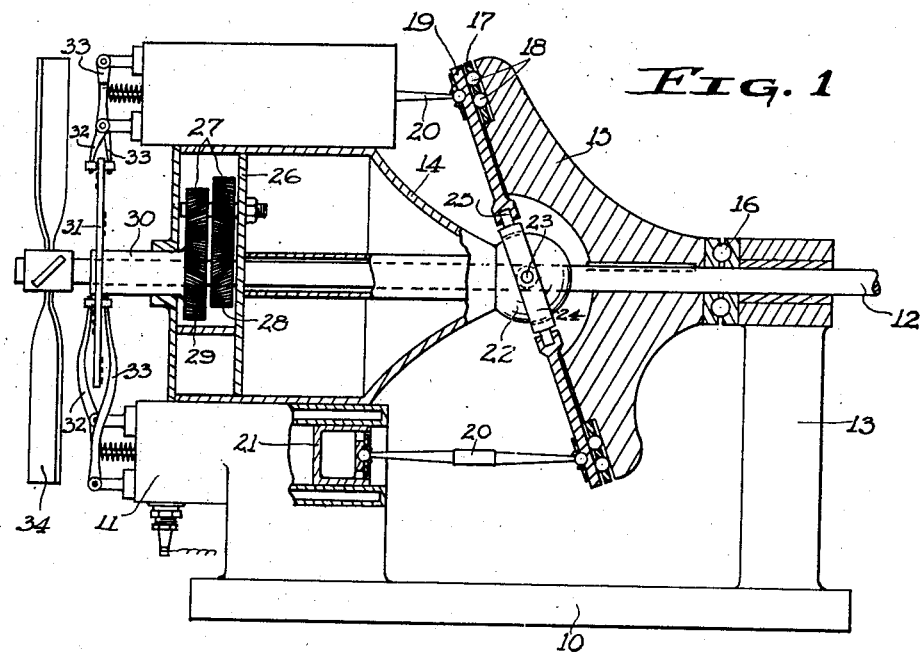
Fig. 1
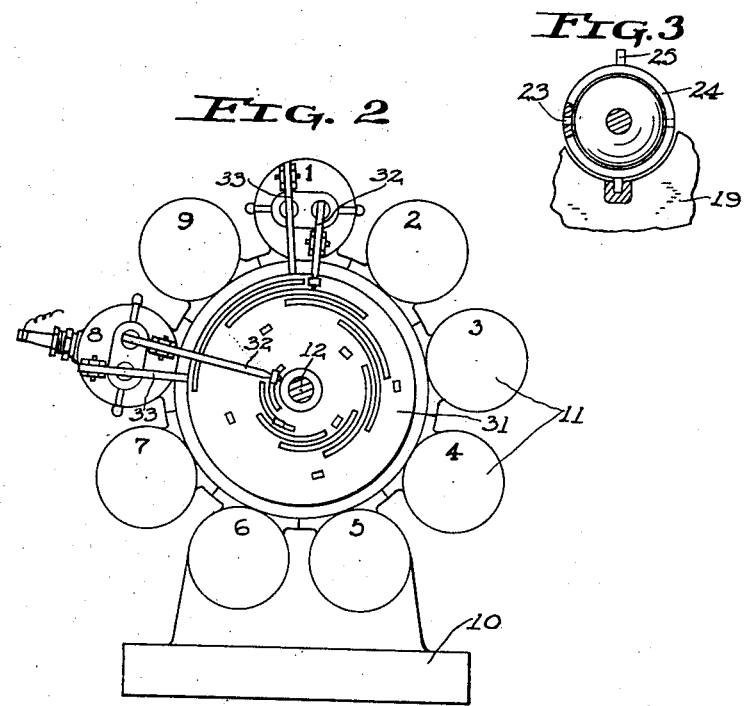
Fig. 2
Fig. 3
WITNESSES
INVENTOR
William D. Schaefer
By R. S. Caldwell
ATTORNEY Patented June 30, 1931

1,812,833

UNITED STATES PATENT OFFICE

WILLIAM D. SCHAEFER, OF MILWAUKEE, WISCONSIN, ASSIGNOR TO MOTORS DEVELOPMENT COMPANY, OF MILWAUKEE, WISCONSIN, A CORPORATION OF WISCONSIN

GAS ENGINE

Application filed July 25, 1929. Serial No. 380,906.

This invention has for its object to provide a gas engine of the multiple cylinder swash plate type, wherein the cylinders of any number arranged parallel and in the form of a circle about a drive shaft have their pistons operate successively upon a thrust ring in bearing engagement with a swash plate fixed on the shaft in an oblique plane.

An object of the invention is to perfect details of construction of a gas engine of this type and of simplifying the mechanism employed for operating the valves of the cylinders.

With the above and other objects in view the invention further consists in the gas engine as herein claimed and all equivalents.

Referring to the accompanying drawings, in which like characters of reference indicate the same parts in different views, Fig. 1 is a central sectional elevation of a gas engine constructed in accordance with this invention;

Fig. 2 is an end view thereof with the fan removed and the valve mechanism shown on a few of the cylinders, by way of example, and Fig. 3 is a detail view of the gimbal joint partly in section.

In these drawings, 10 indicates a base or support on which is mounted an assembly of cylinders 11 which may be of any number, though preferably an odd number, nine being shown and numbered from 1 to 9 consecutively. These cylinders are arranged in parallel relation and in the form of a circle about a drive shaft 12 as the center. Said drive shaft is journalled in a standard 13 on the base 10 and in a housing 14 which occupies the space between the cylinders and constitutes the support therefor.

Keyed on the shaft and oblique thereto is a swash plate 15 having a ball thrust bearing 16 between it and the standard 13, while mounted to turn in an annular recess in its oblique face is a bearing ring 17 having bearing balls 18 caged therein to take the thrust of a thrust ring 19 that has direct connection by means of connecting rods 20 with the pistons 21 of the several cylinders. The connecting rods 20 have ball and socket joints with the pistons and with the thrust ring 19 respectively, and said thrust ring is permitted to gyrate to adapt itself to the revolution of the inclined face of the swash plate without turning. For this purpose, one end of the casing 14 forms a conical projection having a spherical enlargement or head 22 on its end projecting into a central hemispherical recess or cavity in the face of the swash plate 15. The head 22 has diametrically opposite trunnions 23 pivotally fitting within a gimbal ring 24 which has other diametrically opposite trunnions 25 at right angles to the first trunnions and pivotally fitting within sockets formed for them in the edge of the central opening of the thrust ring 19. The bearing ring 19 may thus tilt on a vertical axis or on a horizontal axis, or on both, to maintain its bearing on the face of the swash plate but without having rotation, the angular displacement of the connecting rod with respect thereto and with respect to the pistons incident to this gyratory movement of the thrust ring being accommodated by the ball and socket joints at the ends of the connecting rods.

Within the housing 14 is formed an oil tight gear case 26 containing speed reduction gears 27 including a pinion 28 on shaft 12 and a gear 29 on a half speed sleeve 30 surrounding the shaft, whereby said sleeve is driven from the shaft at one-half of the speed of the shaft, and mounted on the sleeve is a cam disk 31 having arc-shaped raised cam surfaces on its opposite faces for operating the intake and exhaust valves of the respective cylinders.

With a four cycle engine having nine cylinders as shown, the order of firing its 1, 3, 5, 7, 9, 2, 4, 6, 8, and consequently with the cams for operating the cylinders in this order arranged concentrically on the opposite sides of the cam disk 31, it is only necessary that the rocker arms 32 and 33 of the intake and exhaust valves of the respective cylinders should be of proper length to reach and be affected by the raised cam surfaces corresponding with the cylinders. The rocker arms carry rollers on their ends to engage the cam segments, whereby the rocker arms open the valves against the action of their springs. Preferably, the intake and exhaust cams for each cylinder are arranged at the same distance from the center of the disk but diametrically opposite each other to effect proper timing. Because of the angular relation of the cylinders as well as the interval of firing to complete the cycle, the arrangement of the cams will be as shown in Fig. 2, wherein the angular positions of the cylinders as well as the cam segments are numbered to correspond with the cylinder number and the positions of the rollers of the rocker arms for the respective cylinders are shown.

A cooling fan 34 may be provided on the shaft as shown.

What I claim as new and desire to secure by Letters Patent is:

1. In a gas engine, a suitably mounted shaft, a swash plate thereon provided with a central recess, a stationary support, a spherical member thereon receiving the shaft and extending into the recess of the swash plate, a gimbal ring pivotally mounted on the spherical member and having trunnions at right angles to the pivotal axis, a thrust ring pivotally mounted on the trunnions and bearing on the swash plate, engine cylinders arranged in a circle around the shaft, pistons therein, and connecting rods having ball and socket joints with the pistons and the thrust ring.

2. In a gas engine, a suitably mounted shaft, a swash plate thereon, cylinders arranged in a circular formation around the shaft, pistons in the cylinders, a thrust ring bearing on the swash plate, connecting rods connecting the pistons with the thrust ring, a cam disk normal to the shaft and driven thereby, concentrically arranged cams on the disk for the respective cylinders, and cylinder valves having rocker arms engaged and operated by the cams corresponding with said cylinders.

3. In a gas engine, a suitably mounted shaft, a swash plate thereon, cylinders arranged in a circular formation around the shaft, pistons in the cylinders, a thrust ring bearing on the swash plate, connecting rods connecting the pistons with the thrust ring, a cam disk normal to the shaft and driven thereby, concentrically arranged cams on opposite sides of the disk for the respective cylinders, and intake and exhaust valves for each cylinder having rocker arms extending on opposite sides of the disk and engaging and operated by the cams for said cylinder.

4. In a gas engine, a suitably mounted shaft, a swash plate thereon, cylinders arranged in a circular formation around the shaft, pistons in the cylinders, a thrust ring bearing on the swash plate, connecting rods connecting the pistons with the thrust ring, a sleeve mounted on the shaft, a reduction gearing connecting the shaft with the sleeve, a cam disk on the sleeve, intake and exhaust cams on opposite sides of the disk arranged concentrically for the several cylinders, and intake and exhaust valves for each cylinder having rocker arms bearing on opposite sides of the disk and engaging the respective cams for that cylinder.

In testimony whereof, I affix my signature.

WILLIAM D. SCHAEFER.